Oct. 22, 1957  K. N. BROWN  2,810,682
PROCESS FOR ELECTROLYTICALLY PRODUCING SILVER POWDER
Filed June 8, 1953
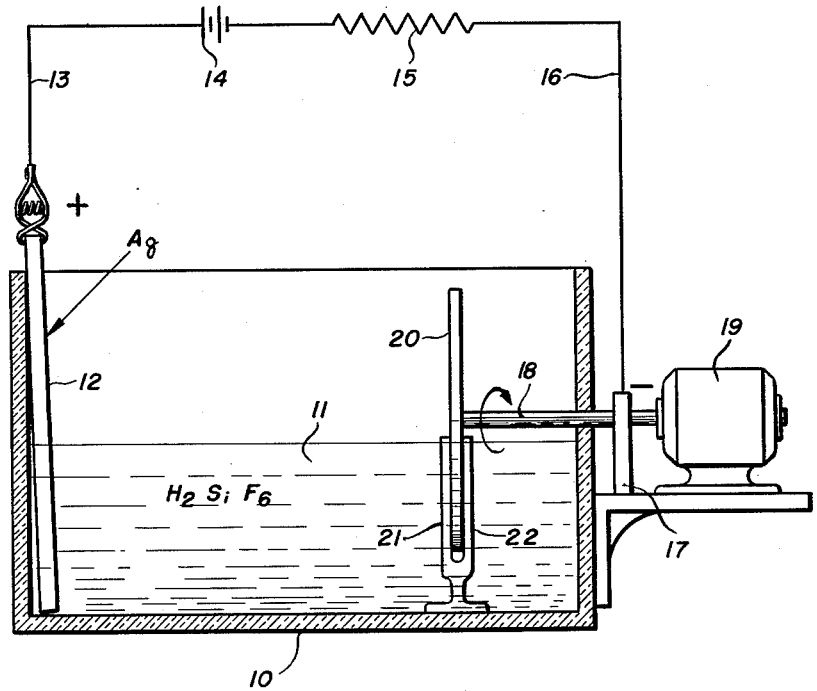
INVENTOR:
KENNETH N. BROWN
BY
Karl F. Ross
AGENT United States Patent Office 2,810,682
Patented Oct. 22, 1957

2,810,682
PROCESS FOR ELECTROLYTICALLY PRODUCING SILVER POWDER

Kenneth N. Brown, Teaneck, N. J., assignor, by mesne assignments, to Ions Exchange & Chemical Corp., New York, N. Y., a corporation of New York Application June 8, 1953, Serial No. 360,019

3 Claims. (Cl. 204—10)

My present invention relates to a process for producing comminuted silver, more particularly (but not exclusively) sinterable silver adapted to be used in the formation of electrodes for electric cells, electrical contacts, filters and the like, as well as other powder-metallurgical applications.

In the manufacture of battery electrodes and other bodies of the above description, it has been found that the type of silver powder most desirable as regards compressibility, sinterability and large effective surface area has a fine, granular structure and contains a minimum of dendrites.

The general object of my invention is to provide a process and apparatus for expeditiously producing silver powder of the character set forth above.

I have found, in accordance with this invention, that the foregoing object may be realized by cathodically recovering silver from an electrolyte containing a substantial concentration of hydrofluorosilicic acid.

Another feature of this invention resides in the use of a rotating cathode, in the form of a disk drum, together with scraper means for continuously removing the deposited silver during the electrolytic process.

The sole figure of the accompanying drawing shows schematically an arrangement for carrying out the process of my invention. A tank 10, which may consist of electrolytically inert, e. g. non-metallic, material, is partly filled with an electrolyte 11 comprising hydrofluorosilicic acid $H_2SiF_6$ in a concentration ranging from about 2% to approximately 30%. A silver plate 12, serving as an anode, is immersed in the electrolyte and is connected via a lead 13 to the positive terminal of a source of direct current here shown as a battery 14. The negative terminal of source 14 is connected by way of a resistor 15 and a lead 16 to a brush 17 which contacts the metallic shaft 18 of a motor 19, this shaft extending into the tank 10. A disk 20, mounted on the tank 10, dips into the electrolyte 11 and co-operates with a pair of non-metallic doctor blades 21, 22 serving to scrape off the deposited silver from its two faces as the disk is rotated by the motor 19.

The disk-shaped cathode 20 and the shaft 18 may consist of a relatively inert metal, such as stainless steel, although the disk may also be made of metallic silver which will not be attacked by the electrolyte when connected to a source of negative potential. The current delivered by the source 14 may range between about 0.2 and 3.0 amperes/square inch, or about 0.03 and 0.5 amp./cm.$^2$. The operating temperature should range, preferably, between about 20 and 50° C. A disk speed of about one-third revolution per minute has been found satisfactory under the above circumstances.

Example

In the apparatus substantially as shown in the figure, an 8% aqueous solution of $H_2SiF_6$ at room temperature was introduced. Commercial silver anodes were suspended in the electrolyte and spatially adjusted with respect to the stainless-steel cathode, rotating at ⅓ R. P. M., to a current density of 0.08 amp./cm.$^2$. This current was maintained during the operation irrespectively of any temperature rise. The agitation provided by the rotating cathode and by the evolution of gas was supplemented by the use of a conventional stirrer. After 20 minutes the current was turned off, the silver was filtered from the electrolyte and dried and its apparent density was measured. This apparent density was 2.2 gm./cm.$^2$.

The arrangement described has been found to yield, with good agitation by means not shown but known per se, a white, granular powder with an apparent density of 1.1 to 2.5 grams/cc. and consisting of 40 to 80% particles of minus 325 mesh. Electrode plates formed, e. g. according to the method described in U. S. Patent No. 2,773,924, issued December 11, 1956, from sintered powder so produced are highly porous, regular in structure and adapted to result in a substantially flat discharge voltage curve when incorporated in an alkaline (e. g. silver-zinc) electric battery. Dimensional changes of the compressed powder during sintering will be absent or negligible.

It will be noted that the electrolyte level in the arrangement illustrated is below the shaft 18, whereby special precautions to prevent leakages at the point of traverse of the casing 10 become unnecessary; moreover, in such case the shaft 18 need not be electrically insulated to prevent the formation of cathodic deposits thereon. Conversely, the doctor blades 21, 22 could be metallic if mounted above the electrolyte level.

The invention is, of course, not limited to the specific embodiment described and illustrated but is capable of numerous modifications and adaptations without thereby departing from the scope of the appended claims.

I claim:

1. A process for producing silver powder, comprising the steps of immersing a silver anode and a cathode in an electrolyte consisting of hydrofluorosilicic acid in a concentration between substantially 2% and 30%, passing a direct current within a range of approximately 0.03 and 0.5 amp./cm.$^2$ between said anode and said cathode whereby a deposit of silver is formed on said cathode, forming a powder by periodically separating said deposit from said cathode, and recovering said powder.

2. A process for producing silver powder, comprising the steps of immersing a silver anode and a cathode in an electrolyte consisting of hydrofluorosilicic acid in a concentration between substantially 2% and 30%, passing a direct current within a range of approximately 0.03 and 0.5 amp./cm$^2$ between said anode and said cathode whereby a deposit of silver is formed on said cathode, forming a powder by applying a scraping member against the surface of said cathode, and recovering said powder.

3. A process for producing silver powder, comprising the steps of immersing a silver anode and a cathode in an electrolyte consisting of hydrofluorosilicic acid in a concentration between substantially 2% and 30%, passing a direct current within a range of approximately 0.03 and 0.5 amp./cm.$^2$ between said anode and said cathode whereby a deposit of silver is formed on said cathode, forming a powder by separating said deposit from said cathode at intervals of approximately three minutes, and recovering said powder.

References Cited in the file of this patent
UNITED STATES PATENTS

| | | |
|---|---|---|
| 1,535,577 | Cleave | Apr. 28, 1925 |
| 2,053,222 | Lucas | Sept. 1, 1936 |
| 2,425,919 | Cox | Aug. 19, 1947 |
| 2,727,083 | Hollman et al. | Dec. 13, 1955 |

OTHER REFERENCES

Mehl: "Production of Metal Powders," Metal Treatment and Drop Forging, Summer, 1950, pages 118 to 126 inclusive.

Jarvis et al.: School of Mines Quart., 1908–1909, vol. 30, pages 119 to 129.

Hughes et al.: Jour. Am. Chem. Soc. (1910), vol. 32, pages 1571 to 1576.